(12) United States Patent
Renken et al.

(10) Patent No.: US 6,560,978 B2
(45) Date of Patent: May 13, 2003

(54) TRANSPORT TEMPERATURE CONTROL SYSTEM HAVING AN INCREASED HEATING CAPACITY AND A METHOD OF PROVIDING THE SAME

(75) Inventors: David Renken, Prior Lake, MN (US); Eric Kirby, Bloomington, MN (US); Michael Schlough, Bloomington, MN (US); John J. Shaw, Savage, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/060,627

(22) Filed: Jan. 29, 2002

(65) Prior Publication Data

US 2002/0083725 A1 Jul. 4, 2002

(51) Int. Cl.⁷ .......................... F25B 49/00; G05D 23/00
(52) U.S. Cl. .......................... 62/132; 237/2 B; 62/159; 62/196.4
(58) Field of Search ................ 62/132, 159, 196.4, 62/151, 278; 237/2 B

(56) References Cited

U.S. PATENT DOCUMENTS

| | | |
|---|---|---|
| 1,053,382 A | 2/1913 | Haennig |
| 1,454,409 A | 5/1923 | Richter |
| 1,540,886 A | 6/1925 | Huff |
| 2,660,407 A | 11/1953 | Lehane ............................ 257/3 |
| 2,693,683 A | 11/1954 | Toothman ................. 62/117.55 |
| 2,734,348 A | 2/1956 | Wright ............................. 62/6 |
| 2,878,654 A | 3/1959 | Kramer ......................... 62/278 |
| 3,203,196 A | 8/1965 | Malkoff ......................... 62/173 |
| 3,219,102 A | 11/1965 | Taylor ............................. 165/2 |
| 3,272,218 A | 9/1966 | Johnson ....................... 137/102 |
| 3,335,738 A | 8/1967 | Christensen et al. ......... 137/102 |
| 3,370,438 A | 2/1968 | Hopkinson .................... 62/196 |
| 3,392,542 A | 7/1968 | Nussbaum .................... 62/196 |
| 3,402,564 A | 9/1968 | Nussbaum .................... 62/173 |
| 3,438,217 A | 4/1969 | Leimbach ..................... 62/196 |
| 3,537,274 A | 11/1970 | Tilney .......................... 62/324 |
| 3,606,904 A | 9/1971 | Taylor ......................... 137/102 |
| 3,696,839 A | 10/1972 | Irie ......................... 137/625.61 |

(List continued on next page.)

FOREIGN PATENT DOCUMENTS

GB 2042150 9/1980

Primary Examiner—Denise L. Esquivel
Assistant Examiner—Marc Norman
(74) Attorney, Agent, or Firm—Michael Best & Friedrich LLP

(57) ABSTRACT

A temperature control system having an increased heating performance. The system includes a compressor adapted to compress a fluid, a heat exchanger coupled to the compressor such that compressed fluid moves from the compressor to the heat exchanger, and a pressure regulating valve positioned between the compressor and the heat exchanger such that compressed fluid from the compressor moves through the valve before reaching the heat exchanger. The pressure-regulating valve is designed to stay in a closed position until the pressure of the fluid from the compressor reaches a desired value. By virtue of this design, the pressure of the fluid in increased, thus resulting in an increased in the temperature of the fluid. Upon reaching the desired pressure, the valve opens to allow the highly-pressurized fluid to flow to the heat exchanger.

16 Claims, 3 Drawing Sheets

U.S. PATENT DOCUMENTS

| | | | |
|---|---|---|---|
| 3,734,169 A | 5/1973 | Falk ............................. | 165/28 |
| 3,794,789 A | 2/1974 | Bynum ........................ | 200/83 |
| 3,798,920 A | 3/1974 | Morgan ....................... | 62/173 |
| 3,949,847 A | 4/1976 | Hoehn ......................... | 192/3.3 |
| 3,973,618 A | 8/1976 | Naley et al. .................. | 165/27 |
| 3,982,664 A | 9/1976 | Robbins et al. ............... | 221/21 |
| 4,122,686 A | 10/1978 | Lindahl et al. ................ | 62/81 |
| 4,122,688 A | 10/1978 | Mochizuki et al. ........... | 62/196 |
| 4,184,341 A | 1/1980 | Friedman ..................... | 62/175 |
| 4,226,604 A | 10/1980 | Weis ............................ | 62/2 |
| 4,258,553 A | 3/1981 | Kelly et al. ................... | 62/117 |
| 4,268,291 A | 5/1981 | Cann ............................ | 62/117 |
| 4,281,676 A | 8/1981 | Morris ......................... | 137/102 |
| 4,306,420 A | 12/1981 | Cann ............................ | 62/196 |
| 4,306,422 A | 12/1981 | Korycki ....................... | 62/324.6 |
| 4,324,105 A | 4/1982 | Cann ............................ | 62/196 |
| 4,325,224 A | 4/1982 | Howland ..................... | 62/196 |
| 4,344,299 A | 8/1982 | Latzer ......................... | 62/448 |
| 4,353,221 A | 10/1982 | Taylor ......................... | 62/239 |
| 4,362,030 A | 12/1982 | Voorhis ....................... | 62/510 |
| 4,363,218 A | 12/1982 | Nussbaum .................... | 62/79 |
| 4,378,816 A | 4/1983 | Peiffer ......................... | 137/116 |
| 4,394,816 A | 7/1983 | Voorhis ....................... | 62/205 |
| 4,419,866 A | 12/1983 | Howland ..................... | 62/228.4 |
| 4,432,210 A | 2/1984 | Saito ............................ | 62/126 |
| 4,437,317 A | 3/1984 | Ibrahim ........................ | 62/81 |
| 4,454,725 A | 6/1984 | Cann ............................ | 62/117 |
| 4,485,635 A | 12/1984 | Sakano ........................ | 62/209 |
| 4,487,031 A | 12/1984 | Rogers et al. ................. | 62/160 |
| 4,517,808 A | 5/1985 | Movshovitz et al. ......... | 62/160 |
| 4,531,547 A | 7/1985 | Hadden ................ | 137/625.64 |
| 4,535,598 A | 8/1985 | Mount ......................... | 62/126 |
| 4,538,422 A | 9/1985 | Mount et al. ................. | 62/201 |
| 4,546,618 A | 10/1985 | Kountz et al. ................ | 62/201 |
| 4,553,584 A | 11/1985 | Bloomquist .................. | 165/30 |
| 4,590,576 A | 5/1986 | Elpiner ........................ | 364/510 |
| 4,602,485 A | 7/1986 | Fujimoto et al. ............. | 62/174 |
| 4,633,675 A | 1/1987 | Sato ............................ | 62/208 |
| 4,635,671 A | 1/1987 | Viegas ......................... | 137/102 |
| 4,685,306 A | 8/1987 | Howland et al. ............. | 62/117 |
| 4,689,967 A | 9/1987 | Han et al. .................... | 62/201 |
| 4,694,390 A | 9/1987 | Lee ............................. | 364/165 |
| 4,706,468 A | 11/1987 | Howland et al. ............. | 62/199 |
| 4,711,095 A | 12/1987 | Howland et al. ............. | 62/117 |
| 4,712,383 A | 12/1987 | Howland et al. ............. | 62/200 |
| 4,720,980 A | 1/1988 | Howland ..................... | 62/81 |
| 4,722,196 A | 2/1988 | Ishikawa ..................... | 62/209 |
| 4,723,416 A | 2/1988 | Suziki ......................... | 62/226 |
| 4,736,597 A | 4/1988 | Anderson et al. ............. | 62/239 |
| 4,742,689 A | 5/1988 | Lowes ......................... | 62/197 |
| 4,748,818 A | 6/1988 | Satterness et al. ............ | 62/160 |
| 4,753,083 A | 6/1988 | Sato ............................ | 62/209 |
| 4,774,813 A | 10/1988 | Yokoyama ................... | 62/81 |
| 4,794,762 A | 1/1989 | Orth et al. .................... | 62/203 |
| 4,800,730 A | 1/1989 | Hipfl et al. ................... | 62/228.3 |
| 4,819,441 A | 4/1989 | Hanson ........................ | 62/160 |
| 4,862,705 A | 9/1989 | Nakamura et al. ........... | 62/324.1 |
| 4,879,901 A | 11/1989 | Leon ............................ | 73/168 |
| 4,896,512 A | 1/1990 | Howland ..................... | 62/117 |
| 4,903,495 A | 2/1990 | Howland et al. ............. | 62/81 |
| 4,912,933 A | 4/1990 | Renken ........................ | 62/81 |
| 4,932,219 A | 6/1990 | Howland et al. ............. | 62/174 |
| 4,936,105 A | 6/1990 | Takechi et al. ............... | 62/129 |
| 4,938,663 A | 7/1990 | Mitsuhashi et al. ........... | 417/44 |
| 4,977,751 A | 12/1990 | Hanson ........................ | 62/81 |
| 4,986,084 A | 1/1991 | Beckhusen ................... | 62/197 |
| 4,990,057 A | 2/1991 | Rollins ........................ | 417/12 |
| 5,056,324 A | 10/1991 | Haley .......................... | 62/115 |
| 5,107,686 A | 4/1992 | Howland ..................... | 62/160 |
| 5,115,643 A | 5/1992 | Hayata et al. ................ | 62/115 |
| 5,123,252 A | 6/1992 | Hanson ........................ | 62/89 |
| 5,142,877 A | 9/1992 | Shimizu ....................... | 62/129 |
| 5,157,933 A | 10/1992 | Brendel ....................... | 62/196.4 |
| 5,168,713 A | 12/1992 | Howland ..................... | 62/117 |
| 5,172,559 A | 12/1992 | Renken et al. ................ | 62/81 |
| 5,193,353 A | 3/1993 | Brendel et al. ............... | 62/196.4 |
| 5,197,297 A | 3/1993 | Brendel et al. ............... | 62/81 |
| 5,203,179 A | 4/1993 | Powell ........................ | 62/180 |
| 5,272,647 A | 12/1993 | Hayes ................... | 364/551.01 |
| 5,295,364 A | 3/1994 | Truckenbrod et al. ........ | 62/209 |
| 5,355,691 A | 10/1994 | Sullivan et al. ............... | 62/201 |
| 5,415,006 A | 5/1995 | Renken et al. ............... | 62/196.4 |
| 5,531,264 A | 7/1996 | Eike et al. .................... | 165/43 |
| 5,537,830 A | 7/1996 | Goshaw et al. ............... | 62/201 |
| 5,557,941 A | 9/1996 | Hanson et al. ................ | 62/160 |
| 5,572,879 A | 11/1996 | Harrington et al. ........... | 62/217 |
| 5,582,236 A | 12/1996 | Eike et al. .................... | 165/43 |
| 5,586,444 A | 12/1996 | Fung ........................... | 62/117 |
| 5,658,131 A | 8/1997 | Aoki et al. ................... | 417/44.2 |
| 5,669,223 A | 9/1997 | Haley et al. .................. | 62/160 |
| 5,689,963 A | 11/1997 | Bahel et al. .................. | 62/129 |
| 5,725,358 A | 3/1998 | Bert et al. .................... | 417/44.2 |
| 5,937,660 A | 8/1999 | Lau et al. ..................... | 62/174 |
| 6,058,728 A * | 5/2000 | Takano et al. ............. | 62/196.4 |
| 6,192,695 B1 * | 2/2001 | Hirota ........................ | 62/196.4 |
| 6,196,012 B1 | 3/2001 | Reason et al. ................ | 62/225 |
| 6,196,295 B1 | 3/2001 | Durham ....................... | 165/42 |
| 6,226,998 B1 | 5/2001 | Reason et al. ................ | 62/230 |
| 6,250,093 B1 * | 6/2001 | Fujii et al. ................... | 63/228.3 |
| 6,301,911 B1 | 10/2001 | Reason et al. ............. | 62/196.2 |
| 6,311,506 B1 * | 11/2001 | Takahashi et al. ......... | 62/196.4 |
| 6,318,100 B1 | 11/2001 | Brendel et al. ............... | 62/217 |

* cited by examiner

TRANSPORT TEMPERATURE CONTROL SYSTEM HAVING AN INCREASED HEATING CAPACITY AND A METHOD OF PROVIDING THE SAME

FIELD OF THE INVENTION

The present invention relates generally to transport temperature control systems and, more particularly, to transport temperature control systems having heating and cooling cycles which utilize hot compressor discharge gas.

BACKGROUND OF THE INVENTION

Transportation temperature control systems typically can operate in either a cooling mode or a heating mode to provide the necessary conditions for a cargo container, such as a truck or trailer box section. Examples of such systems can be found in U.S. Pat. No. 4,419,866 to Howland; U.S. Pat. No. 4,748,818 to Satterness et al.; U.S. Pat. No. 4,912,933 to Renken; U.S. Pat. No. 5,056,324 to Haley; and U.S. Pat. No. 5,669,223 to Haley et al., all of which are incorporated herein by reference. Such systems switch between the cooling and heating modes of operation by way of a mode selector switch. In the cooling mode or cycle, hot compressor discharge gas is fed in series to a condenser, a receiver, a heat exchanger, an expansion valve, an evaporator, an accumulator and back to the compressor. In the heating mode or cycle, the mode selector diverts the hot compressor discharge gas to an evaporator defrost pan heater, the evaporator, the heat exchanger, the accumulator, and back to the compressor. The heating cycle is commonly used to defrost the evaporator. As generally known, in cold environments, such as during the winter months in cold climate areas, it is usually necessary for transportation temperature control systems to generate a certain amount of heat to keep the contents, typically food items or liquid drinks, contained within the truck or trailer box from freezing. Thus, the heating cycle can also be used to warm-up the truck or trailer box.

SUMMARY OF THE INVENTION

It is generally desirable to maximize the heating or defrosting capacity of the heating cycle in order to enhance the operation of a transport temperature control system. It has been observed that known transport temperature control systems sometimes fail to generate sufficient heat to ensure higher operating temperatures within a truck or trailer box when the box is subjected to a cold environment. It has also been observed that known transport temperature control systems sometimes lack enough heating capacity during a heating cycle to properly defrost the evaporator, which results in defrost timeouts because the evaporator does not reach a specified termination temperature during a specified time period. Thus, there is a need for a new and improved transport temperature control system having an increased heating capacity and a method of providing the same. In addition, there is a need to enhance the heating capacity of transport temperature control systems without significantly increasing the costs associated with such systems and without significantly increasing the overall size and weight of such systems so as not to adversely affect the operating efficiency of such systems.

The present invention provides a temperature control system having an increased heating performance. In one embodiment, the system includes a compressor adapted to compress a fluid, a heat exchanger coupled to the compressor such that compressed fluid moves from the compressor to the heat exchanger, and a pressure regulating valve positioned between the compressor and the heat exchanger such that compressed fluid from the compressor moves through the valve before reaching the heat exchanger. The pressure-regulating valve is designed to stay in a closed position until the pressure of the fluid from the compressor reaches a desired value. By virtue of this design, the pressure of the fluid is increased, thus resulting in an increase in the temperature of the fluid. Upon reaching the desired pressure, the valve opens to allow the highly-pressurized fluid to flow to the heat exchanger.

In one embodiment, the pressure-regulating valve includes a pressurized volume having a pressure charge sufficient to offset the compressor discharge pressure so as to close the pressure-regulating valve until such time as the desired compressor discharge pressure is reached. For example, the pressurized volume can be contained by a pressurized dome. In a preferred embodiment, the pressure regulating valve includes an upper plunger communicating with the pressurized volume, a lower plunger communicating with the pressurized fluid, and an actuating member (e.g., an actuating pin) coupling the upper plunger to the lower plunger.

The above-described system can be used in connection with a transport temperature control system that is capable of providing both heating and cooling. Such systems typically include an expansion valve fluidly coupled to the heat exchanger, a condenser fluidly coupled to the expansion valve, and a valve assembly (e.g., a three-way valve) fluidly coupled between the compressor and the pressure-regulating valve. The valve assembly can selectively direct pressurized fluid coming from the compressor to either the condenser (corresponding with the cooling mode) or the pressure regulating valve (corresponding with the heating mode). In the cooling mode, the heat exchanger acts as an evaporator.

The present invention is particularly suitable for increasing the heating performance of an existing temperature control system. To do this, the pressure-regulating valve is sold as a kit with a desired pressure charge. The valve is then installed in fluid communication between the valve assembly and the heat exchanger.

Other features and advantages of the invention will become apparent to those skilled in the art upon review of the following detailed description, claims, and drawings in which like numerals are used to designate like features.

Figure 1:
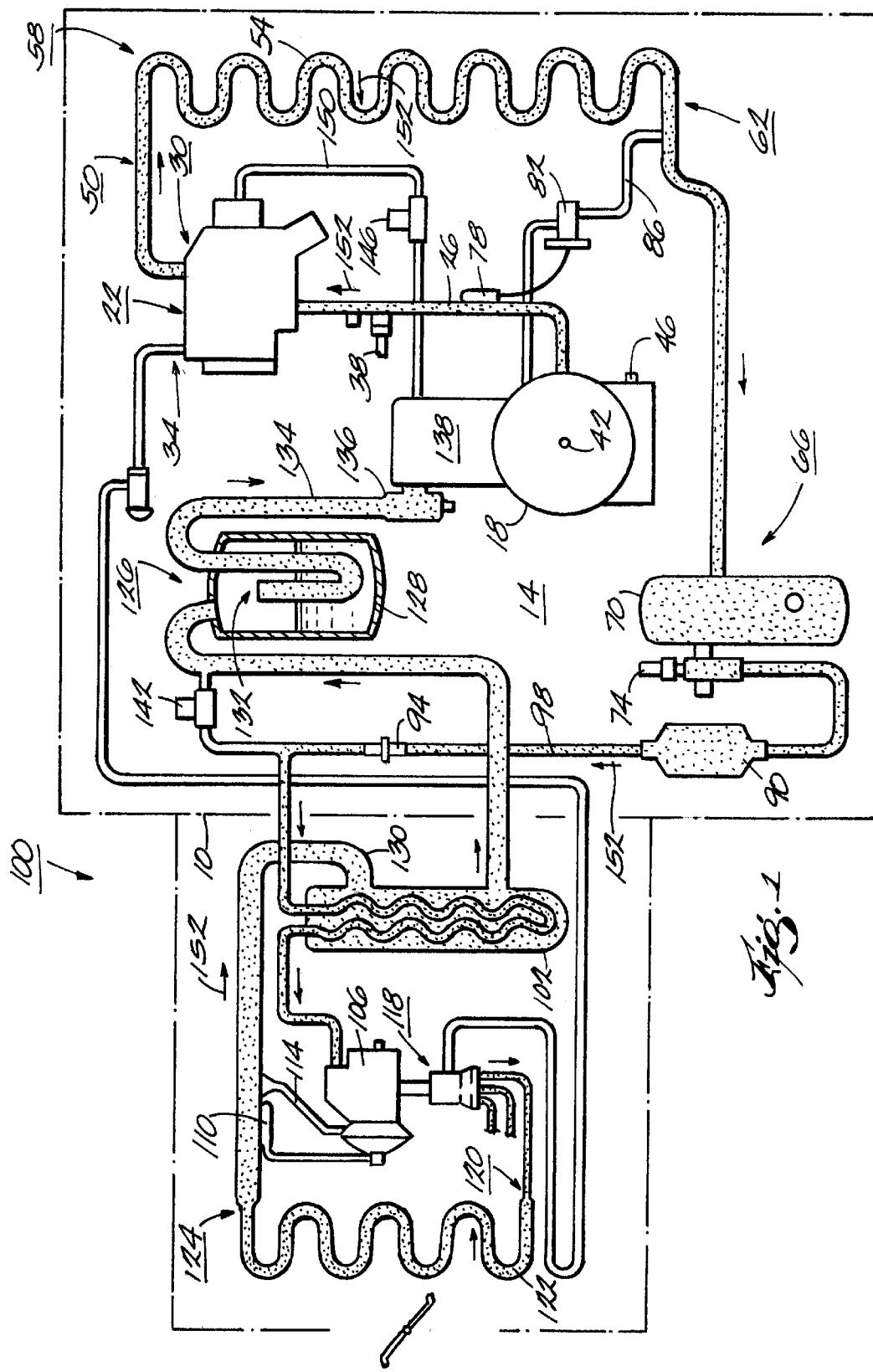
FIG. 1 is a schematic of a transport temperature control system embodying the present invention, the system being in cooling mode.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENT

Figure 2:
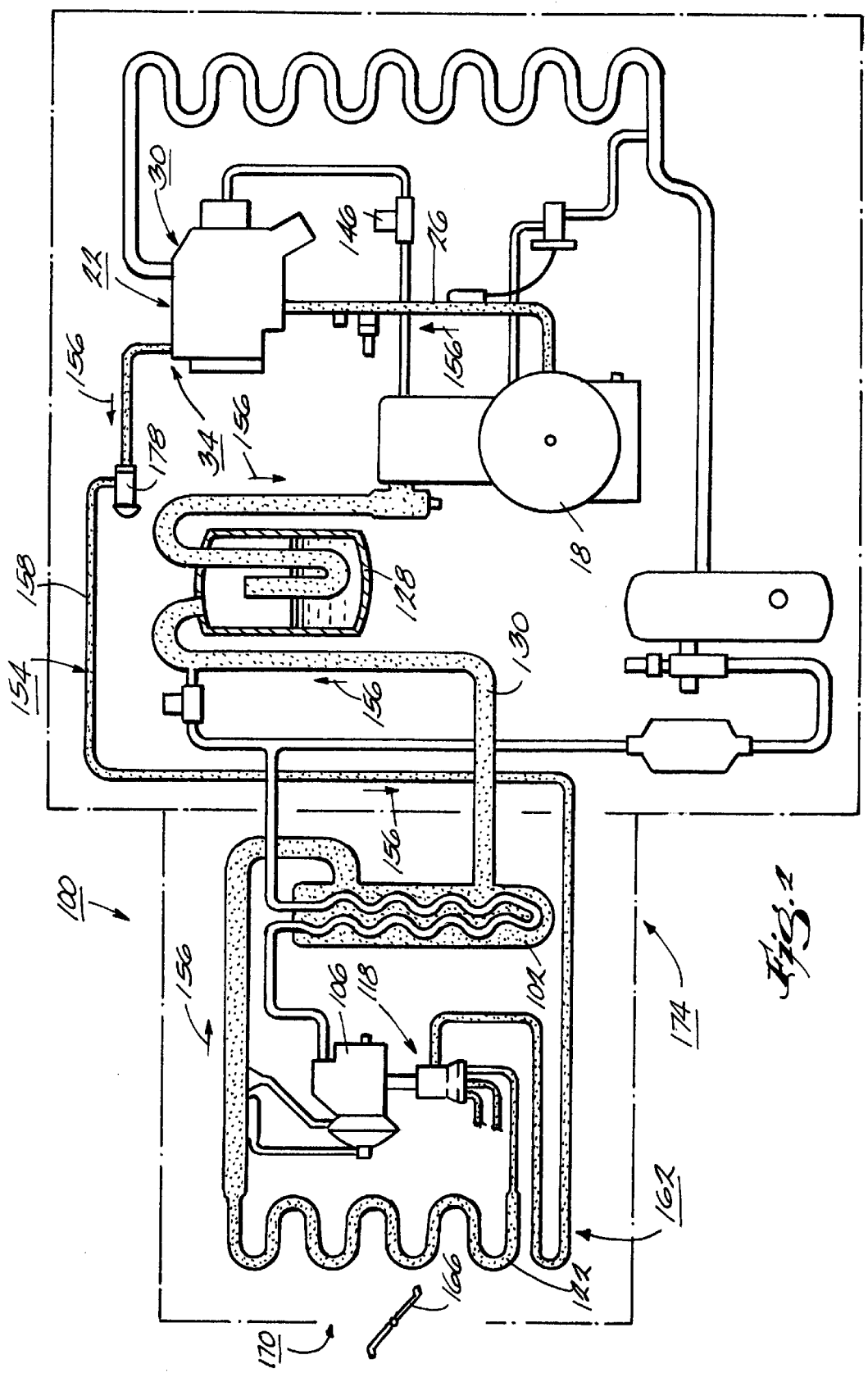
FIG. 2 is another schematic of the transport temperature control system of FIG. 1, the system being in heating mode.

FIGS. 1 and 2 illustrate a transport temperature control system 100 embodying the present invention. It should be understood that the present invention is capable of use in other transport temperature control systems, and the illustrated transport temperature control system 100 is merely shown and described as an example of one such system.

Referring to FIG. 1, the temperature control system 100 is mounted on a suitable surface of a truck or trailer, such as wall 10. The system 100 includes a closed refrigerant circuit 14 that includes a refrigerant compressor 18 driven by a prime mover, such as an internal combustion engine (not shown). The compressor 18 is connected to a heat/cool mode selecting three-way valve 22 via a hot gas line 26. It should be understood that the function of the three-way valve 22, which has cooling and heating outlet ports 30 and 34, respectively, may be provided by separate valves, if desired. A high-pressure cutout 38 is placed within the hot gas line 26. If the discharge pressure of the compressor 18 exceeds a specified value, the high-pressure cutout 38 will inform the controller (not shown) to shut down the compressor 18. A temperature sensor 42 is positioned on the compressor 18. If the temperature of the compressor 18 exceeds a specified value, the sensor 42 will inform the controller to shut down the compressor 18. A sump sight glass 46 is provided on the compressor 18 for viewing the level of the oil in the compressor 18.

FIG. 1 illustrates the cooling cycle of the temperature control system 100. The cooling port 30 of the three-way valve 22 connects the compressor 18 in the cooling cycle 50. The cooling cycle 50 includes a condenser coil 54 having an inlet end 58 and an outlet end 62 that is connected to an inlet side 66 of a receiver tank 70, which includes a service valve 74. A thermal bulb 78, liquid injection valve 82 and liquid injection line 86 cooperate with the outlet end 62 of the condenser coil 54 to inject liquid into the compressor 18 if the compressor 18 is too hot. A filter dryer 90 is located downstream from the receiver tank 70. A one-way check valve 94 is placed in the fluid line or conduit 98 to prevent back flow of the fluid into the receiver tank 70. A dual section heat exchanger 102 is located downstream from the check valve 94.

High-pressure liquid refrigerant passes through a first section of the heat exchanger 102 and continues on to an expansion valve 106. The expansion valve 106 is controlled by an expansion valve thermal bulb 110 and an equalizer line 114. The outlet of the expansion valve 106 is connected to a distributor 118, which distributes refrigerant to inlets on the inlet end 120 of an evaporator coil 122. The evaporator coil 122 is disposed within the box of the truck or trailer. The outlet end 124 of evaporator coil 122 is connected to the inlet end 126 of a closed accumulator tank 128 by line 130 and by way of the remaining or second section of the heat exchanger 102. Gaseous refrigerant in accumulator tank 128 is directed from the outlet end 132 thereof to the suction port of compressor 18 via a suction line 134, a suction service valve 136 and throttling valve 138. A purge valve 142 is placed between the check valve 94 and the accumulator 126. During the cooling mode, the valve 142 is closed so that the refrigerant travels to the heat exchanger 102 rather than directly to the accumulator 126. The function of the valve 142 will be further explained below in connection with the heating cycle.

The three-way valve 22 is operated by a pilot solenoid valve 146, which is in a conduit 150 extending between the compressor 18 and the three-way valve 22. When the pilot solenoid valve 146 is closed, the three-way valve 22 is spring biased to its cooling position to direct hot, high-pressure refrigerant gas from compressor 18 to condenser coil 54. Arrows 152 illustrate the flow of refrigerant from the compressor 18, through the cooling cycle 50, and back again to the compressor 18.

When the pilot solenoid valve 146 is open, the three-way valve 22 is operated to its heating position. FIG. 2 illustrates a heating cycle 154. Arrows 156 illustrate the flow of refrigerant from the compressor 18, through the heating cycle 154, and back to the compressor 18. When the evaporator coil 122 requires defrosting, and also when a heating mode is required to hold the thermostat set point of the load being conditioned, the pilot solenoid valve 146 is opened after a predetermined time delay, as will be further explained below. Opening three-way valve 22 to its heating position blocks refrigerant from flowing out of the outlet port 30 and directs it to the outlet port 34. Thus, the heating position of the three-way valve 22 diverts the hot, high-pressure gas from compressor 18 away from the cooling cycle 50 and into the heating cycle 154.

The heating cycle 154 includes a hot gas line or conduit 158, an evaporator defrost pan heater 162, the distributor 118, the evaporator coil 122, the second section of the heat exchanger 102 and the accumulator 128. The expansion valve 106 is bypassed during the heating mode. If the heating mode 154 is initiated by a defrost cycle, an evaporator fan (not shown) is not operated or, if the fan remains operative, an air damper 166 is closed to prevent warm air from being delivered through the opening 170 into the box of the truck or trailer. If it is desirable to hold a thermostat set point temperature, the evaporator fan may be operated to draw air up through opening 174 and blow the air across the evaporator coil 122 and out the opening 170. The air damper 166 remains open during this operation.

Figure 3:
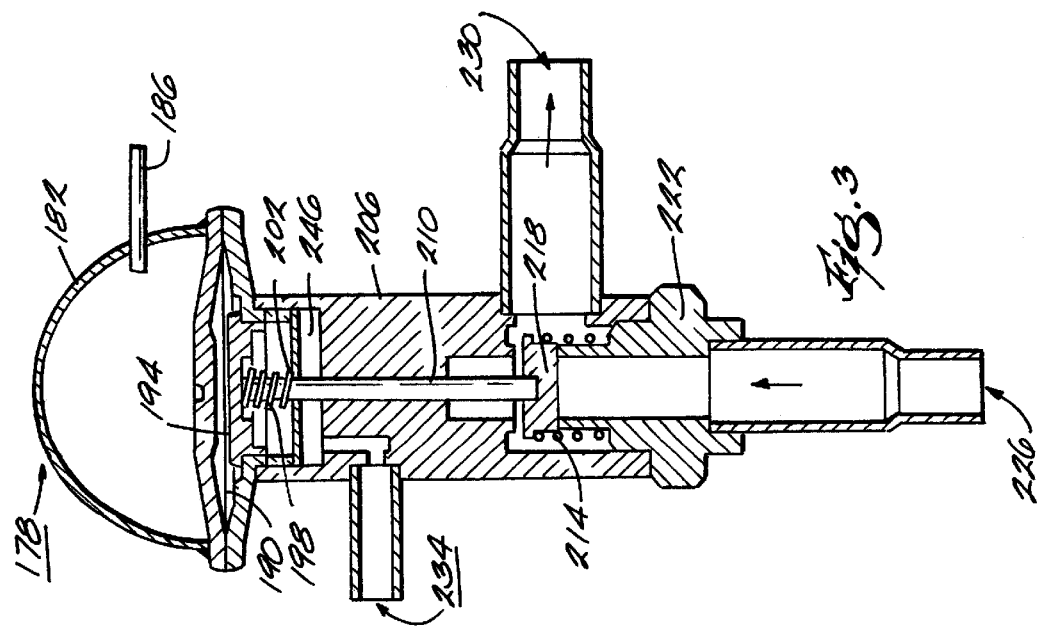
FIG. 3 is a cross-sectional view of a pressure-regulating valve of the transport temperature control system of FIGS. 1 and 2.

The heating cycle 154 further includes a pressure regulating valve 178 positioned within the line 158 downstream from the three-way valve 22. A preferred pressure regulating DPR8 valve 178 available from Alco Controls, a division of Emerson Electric, of St. Louis, Mo. is illustrated in FIG. 3. However, other pressure regulating valves may be used to accomplish the features of the present invention. The main function of the pressure regulating valve 178 is to cause the discharge pressure of the compressor 18 to increase, thereby increasing the temperature of the discharge gas or vapor so as to provide an increased heating capacity for the system 100.

Figure 5:
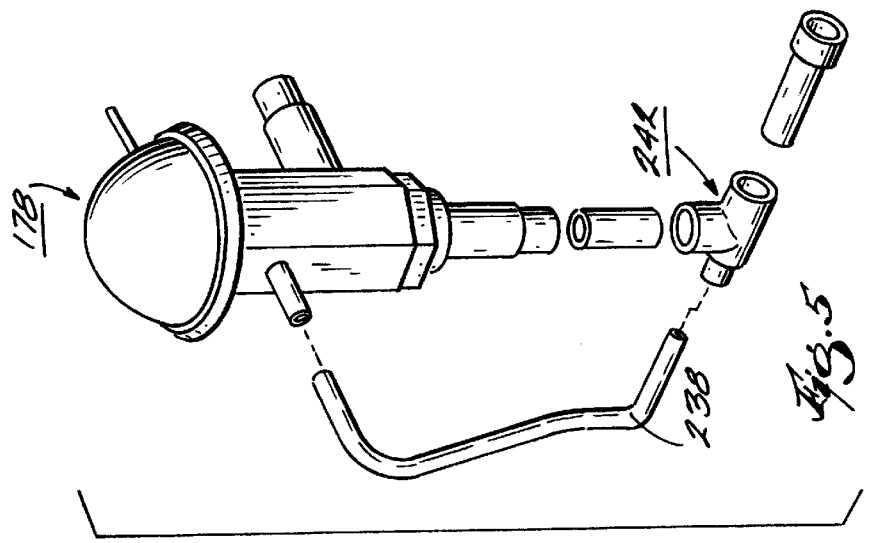
FIG. 5 is an exploded view of the pressure-regulating valve of FIG. 4.
Figure 4:
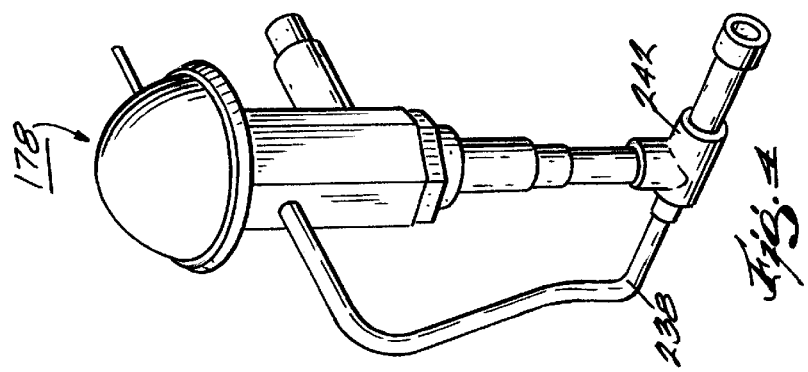
FIG. 4 is a perspective view of the pressure-regulating valve of FIG. 3.

As shown in FIG. 3, the valve 178 includes a dome 182, a charging port 186, a diaphragm 190, an upper plunger 194, a keeper 198 and locator spring assembly 202, a valve body 206, an actuator pin 210, a spring 214, a lower plunger 218, a coupling 222, an inlet 226, an outlet 230, and a pressure regulating inlet 234. A first portion of the line 158 (FIG. 2) extending from the three-way valve 22 communicates with the inlet 226, and the outlet 230 communicates with a second portion of the line 158 that feeds into the evaporator defrost pan heater 162. Although not clearly shown in FIGS. 1 and 2, the pressure regulating inlet 234 is in flow communication with the compressor 18 via line 238 (FIGS. 4 and 5) which communicates with line 158 via coupling 242 (FIGS. 4 and 5).

The dome 182 of the valve 178 is given a predetermined pressure charge via the charging port 186. In a preferred embodiment, the dome 182 is charged at 70 degrees ambient temperature to 325 psig with nitrogen. If the pressure in the dome 182 is greater than the pressure of the discharge gas from the compressor 18, the valve 178 will be closed because the pressure in the dome 182 pushes the diaphragm 190, the upper plunger 194, the actuator pin 210, and the lower plunger 218 in a downward direction (with reference to FIG. 3), such that the lower plunger 218 closes the inlet 226. When the valve 178 is closed, discharge gas from the compressor flows into the inlet 226 and through the line 238. The gas entering the inlet 226 cannot flow any farther until the inlet 226 is opened. The gas flowing through line 238 exits into pocket 246. The upper plunger 194 prevents the gas from flowing out of the pocket 246. As the discharge gas of the compressor is continually pushed against the valve 178, the discharge pressure of the compressor 18 will increase. As the discharge pressure increases, the temperature of the discharge gas increases. Once the pressure of the gas flowing into the pocket 246 exceeds the pressure in the dome 182, the gas in the pocket 246 will push the upper plunger 194, the diaphragm 190, and therefore the actuator pin 210 and lower plunger 218, in an upward direction (with reference to FIG. 3), thereby opening the inlet 226 to allow the hot gas to flow through the valve 178 and out of the outlet 230 to continue on through the heating cycle 154.

The increased temperature of the gas leaving the compressor 18 improves the heating capacity of the system 100. The valve 178 may be operated in various manners, but the valve 178 is preferably adapted to open when a predetermined pressure is reached. This pressure is determined based on the size of the compressor and other considerations so as not to damage the system 100 during operation. In a preferred system, the valve 178 is adapted to open when the compressor discharge pressure is around 400 psia. According to the principles of the present invention, an increase in heating capacity is positively correlated to an increase in the discharge pressure of the compressor 18.

In order to maximize the heating capacity of the system 100, it is desirable to recover the refrigerant that is found in the condenser 54 and receiver tank 70 during the cooling mode 50 before changing to the heating mode 154. Before the three-way valve 22 is opened to the heating mode 154, the purge valve 142 is opened so that gas pushes the refrigerant out of the condenser 54 and tank 70, through the line 98, past the opened purge valve 142 and into the accumulator 128. The purge valve 142 may be any suitable valve, but a TherMax valve available from the assignee of this application is well suited for use with the present invention. Preferably, the purge valve 142 is opened for at least two minutes prior to the opening of the three-way valve 22 for the heating cycle 154.

Variations and modifications of the foregoing are within the scope of the present invention. It should be noted that other solutions to increase the heating capacity of a transport temperature control system have been discovered. One solution is to use engine water to heat the accumulator tank, thereby increasing its effectiveness as an evaporator to increase system heating capacity. However, it was determined that this alone may not be sufficient to boost heating performance an appropriate amount. Another solution is to combine a lower charged discharge pressure-regulating valve with a system which uses engine water to heat the accumulator tank. Although this was determined to provide acceptable results, the additional valves and electronics needed to control this system deemed this solution less satisfactory than the preferred high discharge pressure regulator described above. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A temperature control system comprising:
   a compressor adapted to compress a fluid;
   a heat exchanger coupled to the compressor such that compressed fluid moves from the compressor to the heat exchanger; and
   a pressure regulating valve positioned between the compressor and the heat exchanger such that compressed fluid from the compressor moves through the valve before reaching the heat exchanger, the pressure regulating valve being movable between a closed position, when the pressure of the fluid from the compressor is below a desired value, and an open position, when the pressure of the fluid from the compressor is above a desired value.

2. A temperature control system as claimed in claim 1, wherein the pressure regulating valve includes a pressurized volume having a pressure charge sufficient to offset the compressor discharge pressure so as to close the pressure regulating valve until such time as the desired compressor discharge pressure is reached.

3. A temperature control system as claimed in claim 2, wherein the pressurized volume is contained by a pressurized dome.

4. A temperature control system as claimed in claim 2, wherein the pressure -regulating valve includes an upper plunger communicating with the pressurized volume, a lower plunger communicating with the pressurized fluid, and an actuating member coupling the upper plunger to the lower plunger.

5. A temperature control system as claimed in claim 4, wherein the actuating member is an actuating pin.

6. A temperature control system as claimed in claim 1, further comprising:
   a expansion valve fluidly coupled to the heat exchanger;
   a condenser fluidly coupled to the expansion valve; and
   a valve assembly fluidly coupled between the compressor and the pressure regulating valve, wherein the valve assembly receives pressurized fluid from the compressor, and wherein the valve assembly is movable between a first position, where the pressurized fluid is directed to the pressure regulating valve, and a second position, where the pressurized fluid is directed to the condenser.

7. A temperature control system as claimed in claim 6, wherein the valve assembly in the first position corresponds with a heating mode and the valve assembly in the second position corresponds with a cooling mode.

8. A retrofit kit used to increase the heating performance of an existing temperature control system having a compressor and a heat exchanger, the kit comprising:
   a pressure regulating valve positionable between the compressor and the heat exchanger such that compressed fluid from the compressor moves through the valve before reaching the heat exchanger, the pressure regulating valve being movable between a closed position, when the pressure of the fluid from the compressor is below a desired value, and an open position, when the pressure of the fluid from the compressor is above a desired value.

9. A temperature control system as claimed in claim 8, wherein the pressure regulating valve includes a pressurized volume having a pressure charge sufficient to offset the compressor discharge pressure so as to close the pressure regulating valve until such time as the desired compressor discharge pressure is reached.

10. A temperature control system as claimed in claim 9, wherein the pressurized volume is contained by a pressurized dome.

11. A temperature control system as claimed in claim 9, wherein the pressure-regulating valve includes an upper plunger communicating with the pressurized volume, a lower plunger communicating with the pressurized fluid, and an actuating member coupling the upper plunger to the lower plunger.

12. A temperature control system as claimed in claim 11, wherein the actuating member is an actuating pin.

13. A method of increasing heating performance of a temperature control system having a compressor, a pressure regulating valve, and a heat exchanger, the method comprising:

pressurizing fluid with the compressor;

transporting the pressurized fluid from the compressor to the pressure-regulating valve with the valve in a closed position;

maintaining the valve in the closed position until a desired fluid pressure is obtained;

increasing the fluid pressure to the desired pressure; and opening the valve to allow the pressurized fluid to flow to the heat exchanger.

14. A method as claimed in claim 13, wherein the pressure-regulating valve includes a pressurized volume having a pressure charge, and wherein the opening step includes overcoming the pressure charge to allow the valve to move to the open position.

15. A method as claimed in claim 13, wherein the pressure regulating valve includes an upper plunger communicating with the pressurized volume, a lower plunger communicating with the pressurized fluid, and an actuating member coupling the upper plunger to the lower plunger, and wherein the opening step includes moving the upper plunger, actuating member, and lower plunger.

16. A method as claimed in claim 13, wherein the temperature control system further has a expansion valve fluidly coupled to the heat exchanger, a condenser fluidly coupled to the expansion valve, and a valve assembly fluidly coupled between the compressor and the pressure regulating valve, wherein the valve assembly receives pressurized fluid from the compressor, and wherein the valve assembly is movable between a first position, where the pressurized fluid is directed to the pressure regulating valve, and a second position, where the pressurized fluid is directed to the condenser, and wherein the method further comprises, before the transporting step, moving the valve assembly from the second position to the first position.

* * * * *